(12) United States Patent
Besse et al.

(10) Patent No.: US 9,059,441 B2
(45) Date of Patent: Jun. 16, 2015

(54) DEVICE FOR STORING AND RESTORING ELECTRICAL ENERGY

(75) Inventors: Serge Besse, Ivry sur Seine (FR); Ewen Raugel, Seyne sur Mer (FR); Valéry Chaudron, Manosque (FR); Patrick Bouchard, La Bastidonne (FR); Lucile Voiron, Aix-en Provence (FR); Jean-Daniel Reber, Pertuis (FR); Lucas Jean Bertrand, Courbevoie (FR); Jean-Christophe Hoguet, Villelaure (FR)

(73) Assignee: HELION, Aix en Provence (FR)

( * ) Notice: Subject to any disclaimer, the term of this patent is extended or adjusted under 35 U.S.C. 154(b) by 86 days.

(21) Appl. No.: 13/642,369

(22) PCT Filed: Apr. 18, 2011

(86) PCT No.: PCT/EP2011/056135
§ 371 (c)(1),
(2), (4) Date: Dec. 20, 2012

(87) PCT Pub. No.: WO2011/131622
PCT Pub. Date: Oct. 27, 2011

(65) Prior Publication Data
US 2013/0108939 A1    May 2, 2013

(30) Foreign Application Priority Data

Apr. 20, 2010 (FR) ..................... 10 53020

(51) Int. Cl.
H01M 8/06 (2006.01)
C25B 1/12 (2006.01)
H01M 8/04 (2006.01)
H01M 8/18 (2006.01)
H01M 8/24 (2006.01)

(52) U.S. Cl.
CPC ............... *H01M 8/0656* (2013.01); *C25B 1/12* (2013.01); *H01M 8/04201* (2013.01); *H01M 8/186* (2013.01); *H01M 8/2475* (2013.01); *Y02E 60/366* (2013.01); *Y02E 60/528* (2013.01)

(58) Field of Classification Search
CPC ..... Y02E 60/50; Y02E 60/521; Y02E 60/366; Y02E 60/528; H01M 2008/1095; H01M 8/186; H01M 8/0656
USPC ........................................... 429/422
See application file for complete search history.

(56) References Cited

U.S. PATENT DOCUMENTS

2004/0013923 A1* 1/2004 Molter et al. ............... 429/25
2005/0004716 A1* 1/2005 Lillis et al. .................. 700/287
(Continued)

FOREIGN PATENT DOCUMENTS

DE    100 55 973         5/2002
DE    10055973 A1 *      5/2002
DE    20 2005 011017    12/2005

OTHER PUBLICATIONS

English Translation of DE 10055973A1.*
(Continued)

*Primary Examiner* — Stewart Fraser
(74) *Attorney, Agent, or Firm* — Pearl Cohen Zedek Latzer Baratz LLP

(57) ABSTRACT

The present invention relates to a device (10) for storing and restoring electrical energy comprising a chamber (100) in which water electrolysis means (110), a fuel cell (120), and monitoring/control means (130) for monitoring the operation of said device (10) in the fuel cell mode or the electrolyzer mode are arranged. Connection means (141) enable said chamber (110) to be connected to storage means (210) for storing dihydrogen ($H_2$), which are outside of said chamber (110).

12 Claims, 2 Drawing Sheets

(56) References Cited

U.S. PATENT DOCUMENTS

2005/0178432 A1* 8/2005 Porter et al. .................... 137/14
2008/0166613 A1* 7/2008 Hibbs et al. ..................... 429/26

OTHER PUBLICATIONS

International Search Report for International Application No. PCT/EP2011/056135 mailed Jul. 20, 2011.

* cited by examiner

DEVICE FOR STORING AND RESTORING ELECTRICAL ENERGY

CROSS REFERENCE TO RELATED APPLICATIONS

This application is a National Phase Application of PCT International Application No. PCT/EP2011/056135, International Filing Date Apr. 18,2011, claiming priority of French Patent Application No. 1053020, filed Apr. 20, 2010, which is hereby incorporated by reference.

BACKGROUND OF THE INVENTION

The present invention relates to a device for storing and restoring electrical energy.

The invention refers to the field of producing, storing and supplying electricity, including those relating to the field of renewable energy, and more specifically to the field of producing hydrogen and oxygen by water electrolysis and producing electricity by hydrogen and oxygen fuel cells.

The fuel cell is an electrochemical device that converts chemical energy from a fuel into electrical energy. The operating principle of this electrochemical generator is based on the electrochemical synthesis reaction of water from an oxidizer, such as oxygen, and from a fuel, such as hydrogen.

The operating principle of an electrolyzer is the reverse of that of a fuel cell. While the fuel cell combines, by electrochemical reaction, dihydrogen and dioxygen to form water and supply electricity, electrolysis disassociates water into its constituent elements, i.e., into hydrogen and oxygen, and requires electrical supply.

Therefore, associating an electrolyzer with a fuel cell so as to store electrical energy produced by a source and to restore it on demand is known.

This association is especially known for storing electrical energy produced intermittently or not intermittently, for example by renewable sources of energy, such as wind or solar energy, but also by any primary source whatsoever. Therefore, the electrical energy produced by the primary source is transformed by electrochemical reaction, via the electrolyzer, into dihydrogen and into dioxygen, that are then stored under pressure. The dihydrogen and dioxygen are then converted on demand into electrical energy by means of a fuel cell when a customer electrical load needs electricity that the grid cannot supply or when the primary source no longer produces electricity or produces insufficient electricity with relation to the demand from the downstream electrical load or electrical grid. Therefore, if the device is connected to the electrical grid and supplies a customer, said device serves to restore electricity on customer demand when the grid experiences power failures; And if the device is connected to sources of renewable energy, the device is used to restore electricity when the renewable source does not produce electricity or does not produce enough electricity.

The various known systems are generally bulky and require significant space for their installations. They are also not very modular or flexible, particularly as regards the quantity of energy available, or electric capacity, that they are capable of supplying to the customer grid. Lastly, on-site installations are relatively complex and difficult to maintain. All these difficulties thereby limit a widespread distribution of electrolyzer/fuel cell systems in industry.

SUMMARY OF THE INVENTION

In this context, the invention aims to propose a device for storing and restoring electrical energy aiming to resolve the problems mentioned above.

For this purpose, the invention proposes a device for storing and restoring electrical energy comprising:
  water electrolysis means supplied at the inlet with water and electrical energy and producing at the outlet at least dihydrogen and dioxygen in gaseous form;
  means for storing said dihydrogen in gaseous form;
  a fuel cell supplied at the inlet with at least the stored dihydrogen ($H_2$) and producing at the outlet at least the electrical energy;
  monitoring/control means to control the operation of said device in fuel cell mode or in electrolyzer mode;
characterized in that said device comprises:
  a chamber in which said water electrolysis means, said fuel cell and said monitoring/control means are arranged;
  connection means enabling said chamber to be connected to said storage means for storing said dihydrogen outside of said chamber.

Therefore, thanks to the invention, the device for storing and restoring electrical energy is formed by the combination of an electrolyzer and a fuel cell arranged in a single autonomous and compact chamber that limits the bulk of such a device. The storage means for the dihydrogen gas issued from water electrolysis are disposed separately outside the chamber, which substantially reduces the space requirements of such a device and adjusts its installation according to the various space constraints available on site.

The arrangement of the electrolyzer and the fuel cell into a single chamber improves and facilitates the on-site installation of such a device as well as its maintenance by standardizing, pooling and reducing the elements necessary for operating the electrolyzer and fuel cell. Thanks to the device according to the invention, maintenance is carried out by the standard exchange of various elements constituting the device.

Therefore, the device for storing and restoring electrical energy according to the invention comprising the electrolyzer and fuel cell arranged in a chamber, and means for storing gas outside the chamber, enables rapid on-site installation by connecting the chamber to the inlets and outlets necessary for operating the device while optimally reducing the bulk.

The installation of the device according to the invention is carried out simply by connecting the chamber to the primary electrical energy source, to a water source, to the hydrogen storage means, to a source of or to a means for storing oxygen and to the electrical grid.

The device for storing and restoring electrical energy according to the invention may also present one or more of the characteristics below, considered individually or according to all technically possible combinations:
  the device comprises means for storing said dioxygen in gaseous form;
  the device comprises connection means connecting said chamber to said storage means for storing said dioxygen outside of said chamber;
  said fuel cell is supplied at the inlet with said stored dioxygen;
  said connection means comprise a plurality of interfaces enabling a detachable and impermeable connection of said storage means so as to make the means modular;
  said chamber comprises means to convert electrical energy common to said electrolyzer and to said fuel cell;
  said chamber comprises cooling means common to said electrolyzer and to said fuel cell;
  said chamber comprises at least one interface enabling a detachable connection of a water supply and/or an electrical power supply and/or an electrical control supply;

said chamber comprises a water reservoir supplying said electrolyzer and storing the water produced from said fuel cell;

said chamber is supplied at the inlet with a source of renewable energy and/or with a source of fossil energy and/or with a source of nuclear energy.

the device comprises heat recovery means, notably a chamber cooling circuit.

BRIEF DESCRIPTION OF THE DRAWING

Other characteristics and advantages of the invention will emerge more clearly from the description provided below, for indicative and in no way limited purposes, with reference to the attached figures, among which.

In all figures, common elements bear the same reference numbers, unless otherwise stated.

DETAIL DESCRIPTION OF THE INVENTION

Figure 1:
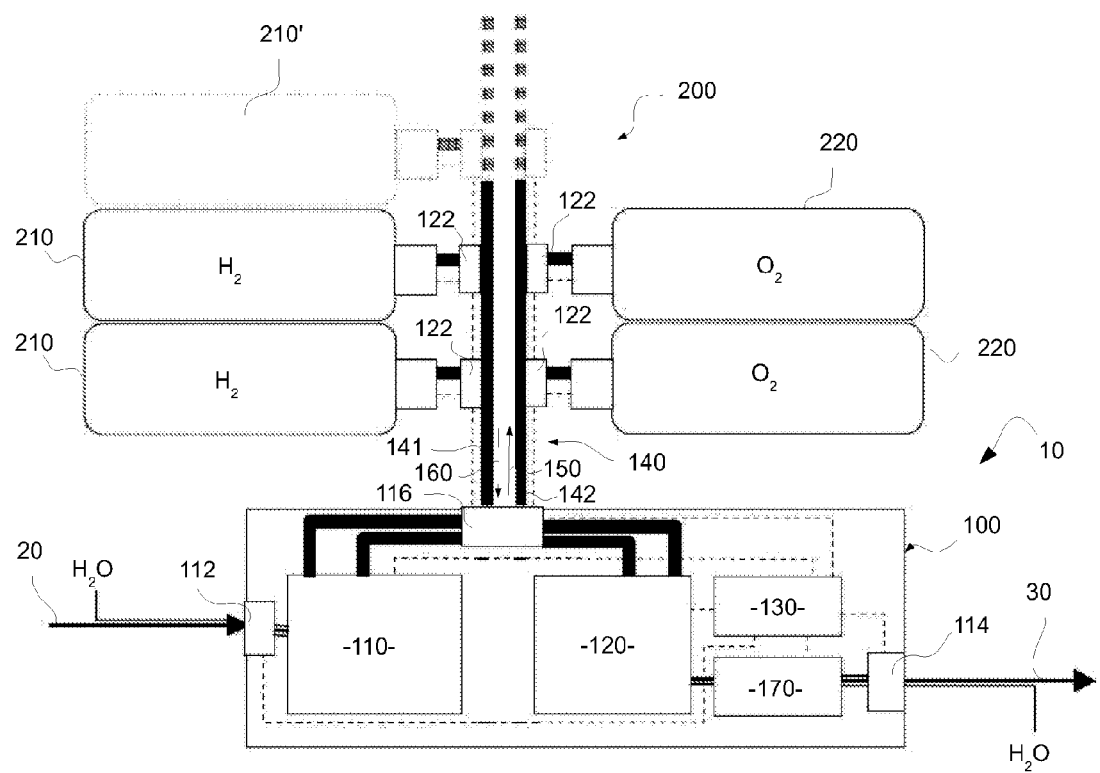
FIG. 1 is a schematic representation of a first embodiment of a device according to the invention.

FIG. 1 schematically illustrates a first embodiment of a device for storing and restoring electrical energy according to the invention.

Device 10 is connected to a primary electrical energy source 20 that may produce electrical energy intermittently, for example by renewable energy, such as wind or solar energy, but also by any primary source whatsoever, of the power plant type.

Device 10 enables, by chemical reaction, the primary electrical energy produced to be converted in the form of storable gas. The gas thus produced and stored is then transformed by reverse electrochemical reaction so as to reproduce electrical energy, known as secondary energy, in case of need or the temporary suspension of the primary electrical energy source.

For this purpose, device 10 according to the invention is formed by the combination of a chamber 100 that is advantageously compact so as to be able to be easily installed on site and by storage means 200 that are outside the chamber 100 and that are connected to the chamber by connection means 140.

Chamber 100 is an autonomous chamber, for example of the metallic container or housing type, in a substantially parallelepiped form that may be installed either inside or outside a building. Advantageously, chamber 100 is installed outside a building so as to not unnecessarily obstruct the internal space of the building. For this purpose, chamber 100 is constructed so as to be able to withstand various meteorological conditions. Therefore, chamber 100 is impermeable and impervious to adverse weather (UV radiation, temperature variations, etc.).

The storage means 200 outside of chamber 100 are disposed either nearby or relatively far from chamber 100.

Therefore, device 10 is likely to be implemented without difficulty under extreme external conditions.

The modularity aspect mentioned here, independently from another modularity aspect developed subsequently in the description, therefore adjusts the installation of device 10 according to the needs of users and to various space constraints. By way of example, when chamber 100 is disposed inside a building, storage means 200 may be disposed outside the building that houses chamber 100 of device 10 so that the storage means do not occupy useful space on the site.

Chamber 100 comprises:
water electrolysis means 110, such as an electrolyzer;
a fuel cell 120;
monitoring/control means 130 to control the operation of device 10 in fuel cell mode or in electrolyzer mode;
means to convert electrical energy 170;
means to cool (not represented) chamber 100
inlet interface 112;
outlet interface 114;
an interface 116 communicating with storage means 200.

Interfaces 112, 114, 116 are standard communication interfaces enabling communication with other external elements to which chamber 100 is likely to be associated. Interfaces 112, 114, 116 are conventional interfaces enabling a rapid and impermeable detachable connection of the pipework for circulating fluid ($H_2O$) or gas ($H_2$ and $O_2$), and/or a detachable electrical power connection and/or a detachable electrical control connection.

Therefore, the inlet interface 112 and outlet interface 114 are interfaces comprising at least one detachable electrical power connection and one detachable water pipework connection.

Interface 116 is an interface comprising at least one detachable electrical control connection and one detachable gas pipework connection, and advantageously a detachable dihydrogen ($H_2$) pipework connection and a detachable dioxygen ($O_2$) pipework connection.

The inlet interface 112 is connected to the primary electrical energy source 20 but also to a water system or to a water reservoir, advantageously single, outside of chamber 100.

The outlet interface 114 is connected to the electrical grid 30 of the user but also to the water system or to the single water reservoir. The water inlet, via inlet interface 112, supplies the electrolyzer 110 in electrolyzer mode and the water outlet, via outlet interface 114, evacuates the water produced by the fuel cell. Chamber 100 also comprises water management means (not represented) controlling the water inlets and outlets according to the operational mode of device 10, for example by a system of valves controlled by the water management means.

Therefore, chamber 100 presents communication interfaces enabling at least one detachable electrical power connection, a detachable water pipework connection, and a detachable gas pipework connection.

According to a variation of the device according to the invention, the water reservoir may be integrated inside chamber 100.

In the presence of a primary electrical supply, electrolyzer 110 dissociates water into its constituent elements in gas form, i.e., dihydrogen ($H_2$) and dioxygen ($O_2$).

The electrolysis of water ($H_2O$) is a well-known process that constitutes a means to produce dihydrogen ($H_2$) and dioxygen ($O_2$) of high purity on request or on demand.

Conventionally, the electrolyzer 110 comprises a succession of elementary levels, also known as electrochemical cells or electrolytic cells (stack), each of the electrolytic cells being formed by at least one cathode, an electrolyte and an anode; The electrolyte being gripped between the anode and the cathode. The cathode and the anode are electrically conductive porous electrodes while the electrolyte is an electrically insulating and ion (anion and proton) conductive membrane.

Under the effect of a potential difference between the two electrodes, the reagent, i.e., water ($H_2O$), is dissociated into dihydrogen ($H_2$) gas and dioxygen ($O_2$) gas.

The device 10 according to the invention therefore uses the principle of water electrolysis to convert the electrical energy produced by the primary source 20 in the form of dihydrogen ($H_2$) and dioxygen ($O_2$) gas.

The electrolyzer 110 is capable of operating at various pressures on a pressure range substantially varying between atmospheric pressure and a few tens of bar.

The fuel cell 120 is also an electrochemical device converting the chemical energy of a fuel into electrical energy according to the electrochemical synthesis reaction of water.

The operating principle of this electrochemical generator is based on the electrochemical synthesis reaction of water from an oxidizer, dioxygen, and from a fuel, dihydrogen. The operating principle of the fuel cell 120 is therefore the reverse of the operation of the electrolyzer 110.

Conventionally, the fuel cell 120 also comprises a succession of electrolytic cells (stack) formed by at least one anode, an electrolyte and a cathode; the electrolyte being gripped between the anode and the cathode. The cathode and the anode are electrically conductive porous electrodes while the electrolyte is an electrically insulating and ion (anion and proton) conductive membrane.

In the fuel cell 120, the fuel, i.e., dihydrogen ($H_2$), is brought to the anode so as to undergo catalytic oxidation, releasing protons and electrons in the case of a proton exchange membrane. The electrons produced circulate along the outer electrical circuit, while the protons are transported from the electrolyte to the cathode, where they combine with electrons and the oxidizer, i.e., dioxygen ($O_2$). This cathodic reduction is accompanied by the production of water and the establishment of a potential difference between the two electrodes that will be used to supply grid 30.

According to the embodiment illustrated, the electrolyzer 110 and the fuel cell 120 have distinct electrolytic cells. According to another embodiment, the electrolyzer and the fuel cell comprise at least one electrolytic cell in common, then called a reverse electrolytic cell or stack.

Device 10 according to the invention operates according to two distinct modes of operation: a first operating mode known as "electrolyzer mode" and a second operating mode known as "fuel cell mode."

In the first embodiment, said electrolyzer mode, the primary source 20 provides electrical energy to device 10. In this mode, the electrolyzer 100 converts the electrical energy provided by the primary source 20 into storage chemical energy, i.e., it converts the primary electrical energy into dihydrogen and into dioxygen in gaseous form.

The dihydrogen ($H_2$) gas and the dioxygen ($O_2$) gas thus produced by water electrolysis are channeled outside of the chamber 100 by means of interface 116.

Connection means 140, of the pipework type enabling the circulation of gas, are connected to interface 116 so as to channel the gas to the storage means 200.

The dihydrogen ($H_2$) gas is channeled, via the connection means 141, to the dihydrogen ($H_2$) storage means 210.

The dioxygen ($O_2$) gas is channeled, via the connection means 142, to the dioxygen ($O_2$) storage means 220.

For this purpose, connection means 141 and 142 comprise a plurality of interfaces 122 distributed over the length of connection means 141, 142. Interfaces 122 are gas flow interfaces and electrical control interfaces enabling a storage means 210, 220 to be connected to device 10, particularly to a connection means 141, 142. Interfaces 122 may comprise a system of valves enabling the storage means 210, 220 to be isolated on demand from the gas flow circulating in connection means 141, 142.

During the second mode of operation, known as the fuel cell mode, the dihydrogen ($H_2$) and dioxygen ($O_2$) stored in storage means 210 and 220 is channeled to chamber 100 via the respective connection means 141 and 142, and introduced into chamber 100 via interface 116 so as to be converted into electrical energy by fuel cell 120 of device 10.

Therefore, fuel cell 120 enables the dihydrogen ($H_2$) stored in storage means 210 and the dioxygen ($O_2$) stored in storage means 220 to be combined by electrochemical reaction to form water and provide secondary electrical energy to an electrical grid 30.

Managing the switch from the first operational mode to the second operational mode is carried out by monitoring/control means 130 that alternately activate either the electrolyzer 110 of device 10, in electrolyzer operational mode, or the fuel cell 120 of device 10, in fuel cell operational mode.

Switching the operational mode from the first mode to the second mode and conversely is determined according to the parameters defined by the user. These parameters are particularly dependent on the power level of the primary source 20. In case of insufficient electrical power or else in case of a supply fault from the primary source 20, device 10 switches from electrolyzer mode to fuel cell mode so as to supply electrical energy to the customer electrical load or to the electrical grid 30, known as secondary electrical energy.

The gas storage means 200 formed by the distinct means for storing dihydrogen 210 and dioxygen 220 are, for example, tanks capable of storing pressurized gas.

The regulation and circulation of dihydrogen ($H_2$) and dioxygen ($O_2$) gas inside chamber 100, but also between chamber 100 and storage means 200, are controlled by monitoring/control means 130, by controlling a set of valves (not represented), for example integrated into each interface 112, 114, 116, 122.

Therefore, connection means 141 and 142 channel the gas produced in electrolyzer mode from chamber 100 to storage means 200, along the direction indicated by arrow 150, and channel the gas in the opposite direction, i.e., from storage means 200 to chamber 100, as illustrated by arrow 160, in fuel cell mode.

Each of the valves of the device may be independently controlled in opening and closing, such that the user may optimize the management of the gas flows of the installation. The opening and closing of each storage means 200 therefore enables the capacity of one or more specific storage means 210, 220 to be managed independently, or else enables a specific storage means to be filled and/or emptied on a priority basis, for example for an inspection or for maintenance.

The valves of interfaces 122 combined with the valves of interface 116 also enable the capacity of a storage means 21, 220 to be pumped over to a second storage means 210, 220, if necessary.

Advantageously, the valves from each interface are electrically controlled by the monitoring/control means 130, the various interfaces 112, 114, 116, 122 being electrically connected to the monitoring/control means 130.

Storage means 200 are therefore autonomous and modular elements of device 10 as it is possible to add and/or remove the means in a simple and rapid manner. In fact, storage means 200 also comprise an interface enabling the rapid impermeable disassembly of a connection of the gas pipework type.

Therefore, the addition of an additional storage means 210' (illustrated in dotted lines in FIG. 1) is carried out simply by connecting or hooking up the storage means 210' to one of the interfaces 122 by means of a gas pipework.

According to a second embodiment, the valves enabling the independent opening/closing of storage means 200 are directly integrated with storage means 210, 220. In this embodiment, storage means 210, 220 comprise electrical connection means for controlling the valve via the monitoring/control means 130 in addition to a gas pipework connecting storage means 210, 220 to interface 122.

According to a variation of embodiment of the invention, the gas entering and departing chamber 100 is channeled between chamber 100 and storage means 200 by two different transport conduits, such that a storage means comprises two supply conduits (one inlet conduit and one outlet conduit) connected with an interface 122 to device 10.

Means 170 for converting electrical energy adapts the power and current type from primary source 20 to the power and current type necessary for operating electrolyzer 110. For this purpose, means 170 are formed by an alternating current/direct current (AC/DC) converter and/or by a direct current/direct current (DC/DC) converter if, for example, the primary source is a direct current source, such as for example photovoltaic cells.

The same means 170 are also used for converting the electrical energy produced by fuel cell 120 (of the direct current type) into alternating current or into direct current, depending on the needs of grid 30. Means 170 may be cooled by a cooling circuit used to cool the electrolyzer and the fuel cell.

The chamber 100 cooling means (not represented) cool chamber 100 and evacuate the heat emitted by the electrochemical reactions of the fuel cell and the electrolyzer. The cooling means are formed for example by a cooling circuit circulating between the electrolytic cells of the fuel cell and/or the electrolyzer, by a ventilation system enabling cooling of chamber 100 or else by a combination of a cooling circuit and a ventilation system, or by any other type of cooling system conventionally used to cool a fuel cell or an electrolyzer.

According to another embodiment, the heat recovered in chamber 100 by the cooling circuit may be re-used to, for example, heat, cool or air condition (by using an additional device) the building in which device 10 is located, or may possibly be stored for a later use, still for a heating, cooling or air-conditioning use.

In a conventional manner, chamber 100 may also comprise means to purify the gas produced in electrolyzer mode so as to separate the water in vapor form present in the electrolyzer 110 products and also to eliminate traces of impurities in the gas such as oxygen in hydrogen and vice versa.

Chamber 100 may also comprise humidification means enabling the gas stored in the storage means to be humidified with water vapor before it is channeled to the fuel cell 120.

The chamber may also comprise compression means enabling the gas produced by electrolyzer 110 to be pressurized before being stored in the storage means.

Advantageously, chamber 100 has a length of about ten meters and a few meters in width and in height.

Therefore, chamber 100 forms a compact and autonomous container enabling electrical energy to be stored and restored, comprising a fuel cell, an electrolyzer and the various elements necessary for their operation, with the exception of gas storage means, which are voluminous.

By way of example, a container with dimensions of 12 m×2.40 m×2.30 m is sufficient for receiving a 500 kW fuel cell and a 70 Nm3/h electrolyzer as well as the various elements necessary for their operation.

According to a second embodiment of the invention, device 10 only comprises dihydrogen storage means 220. In this embodiment, the chamber disposes an outlet valve (not represented) allowing the dioxygen, produced in electrolyzer mode, to escape into the ambient atmosphere as well as an inlet valve enabling the fuel cell to be supplied with dioxygen, by admitting air, in fuel cell operational mode. In another example of embodiment, the dioxygen is recovered to be used for other purposes, for example in the chemical industry.

Preferentially, the dioxygen ($O_2$) outlet valve and the inlet valve are made from a single valve.

This second embodiment therefore reduces the space allocated for gas storage for operating the device but also optimizes the allocated space so as to increase the dihydrogen storage capacity, which directly affects the electrical energy restoring capacity of the device.

Thanks to the externalization of chamber 100 storage means 200, it is possible to simply adjust the capacity and/or number of tanks dedicated to gas storage in order to adapt device 10 to the needs of the user according to the electrical energy capacity required.

Therefore, for a same chamber 100, i.e., with an electrolyzer 110 and a fuel cell 120 of fixed capacity, it is possible to vary the storage capacity and therefore the electrical energy restoration capacity, i.e., the length of time during which device 10 is capable of providing a given electrical power volume.

The modularity and rapid and simplified disassembly of the various elements constituting the device, such as reversible electrolytic cells, gas storage means, gas pipework, interfaces and the chambers themselves, enable a device for storing and restoring electrical energy to be obtained that is completely parameterable and adjustable according to the needs of each user.

Figure 2:
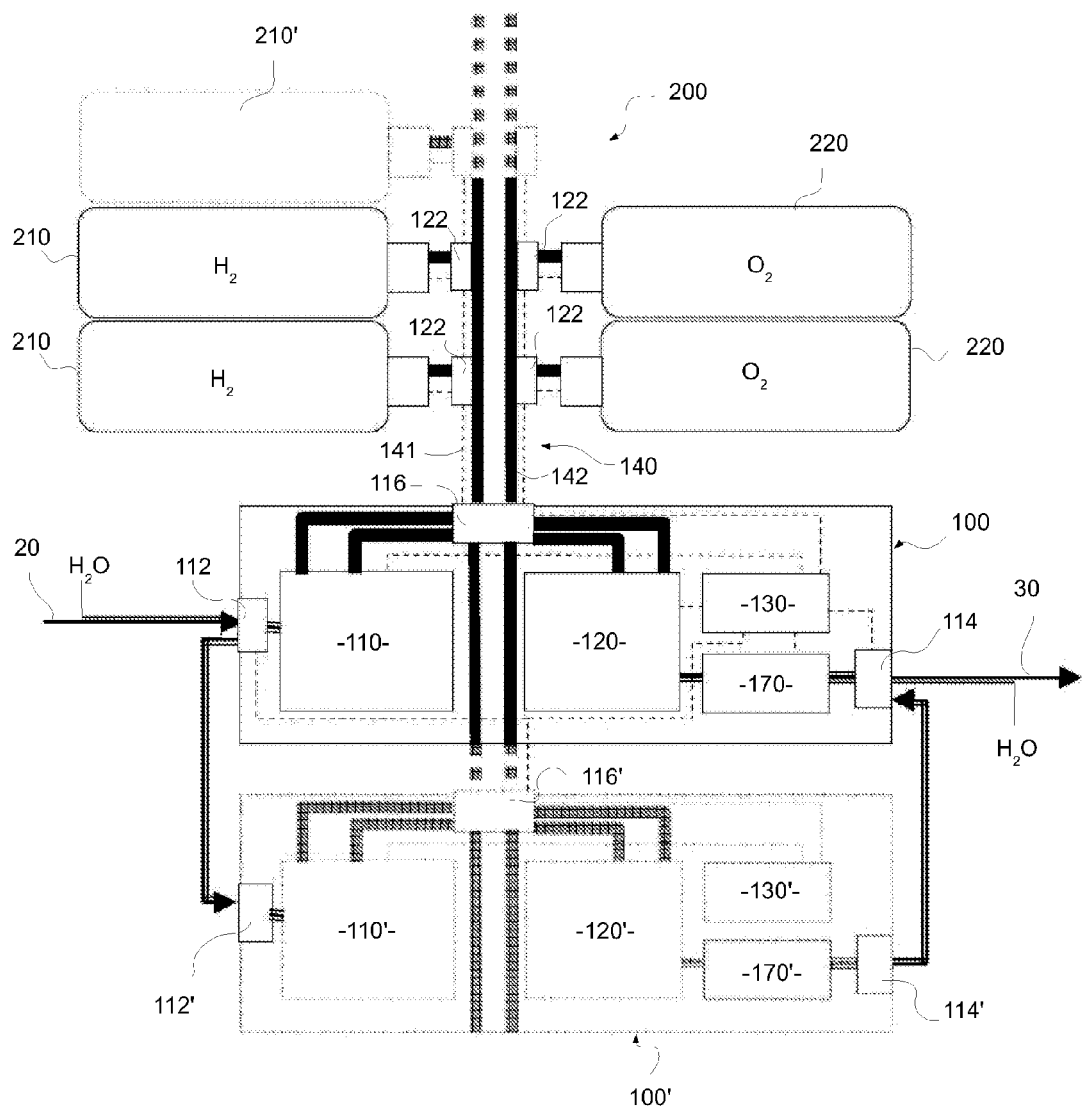
FIG. 2 is a schematic representation of a second embodiment of a device according to the invention.

According to a second embodiment illustrated in FIG. 2, combining several chambers 100 such as previously described is possible, so as to adjust the power or gas storage capacity according to user demand. In the example illustrated, the second chamber 100' is connected to the first chamber 100. The gas thus produced or necessary for producing secondary electrical energy is stored by the same storage means 200.

The connection of several chambers is carried out simply by the parallel hookup of the various interfaces of each chamber in the following manner:

the inlet interface 112' of the second chamber 100' is connected to the inlet interface 112 of the first chamber 100, for example by means of a fluid circulation pipework and an electrical power connection;

the outlet interface 114' of the second chamber 100' is connected to the outlet interface 114 of the first chamber 100, for example by means of a fluid circulation pipework and an electrical power connection;

the interface 116' of the second chamber 100' is connected to the interface 116 of the first chamber 100, for example by means of gas circulation pipework and an electrical control connection.

The electrolyzer of the device according to the invention is either, for example, an electrolyzer of the proton exchange membrane (PEM) type, an electrolyzer of the alkaline type, a high-temperature electrolysis (HTE) electrolyzer, a solid oxide electrolysis cell (SOEC) electrolyzer, or else a combination of these various electrolyzer technologies.

The fuel cell of the device according to the invention is either, for example, a proton exchange membrane (PEM) fuel cell, a phosphoric acid fuel cell (PAFC), a solid oxide fuel cell (SOFC), a molten carbonate fuel cell (MCFC), an alkaline fuel cell, a direct methanol fuel cell (DMFC) or else a combination of these various fuel cell technologies.

The various elements of the device according to the invention may comprise a flatness management system in order to be able to be installed on any site whatsoever, prepared or not.

The device according to the invention also simplifies the maintenance of such a device by standardizing the various elements constituting the device.

Other advantages of the invention are, in particular, as follows:
- simplified commercial production by standardizing the various elements constituting the device;
- reduced manufacturing costs;
- modularity of the device so as to obtain the required electrical power;
- reduced environmental impact by the selective disassembly and/or re-use of elements in future utilizations.

The invention claimed is:

1. A device for storing and restoring electrical energy comprising:
   a water electrolyzer supplied with water and electrical energy and configured to produce at least dihydrogen ($H_2$) and dioxygen ($O_2$) in gaseous form;
   a storage device configured to store said dihydrogen ($H_2$) in gaseous form;
   a fuel cell supplied with at least the stored dihydrogen ($H_2$) and configured to produce at least the electrical energy;
   a monitoring/control processor configured to control the operation of said device in fuel cell mode or in electrolyzer mode;
   a chamber in which said water electrolyzer, said fuel cell and said monitoring/control processor are arranged; said chamber comprising communication interfaces enabling at least one detachable electrical energy connection, one detachable water pipework connection and one detachable gas pipework connection; and
   conduits configured to connect said chamber to said storage device for storing said dihydrogen ($H_2$) outside of said chamber.

2. The device for storing and restoring electrical energy according to claim 1, further comprising a storage device configured to store said dioxygen ($O_2$) in gaseous form.

3. The device for storing and restoring electrical energy according to claim 2, further comprising conduits connecting said chamber to said storage device configured to store said dioxygen ($O_2$) outside of said chamber.

4. The device for storing and restoring electrical energy according to claim 3, wherein said fuel cell is supplied with said stored dioxygen ($O_2$).

5. The device for storing and restoring electrical energy according to claim 1, wherein said conduits comprise a plurality of interfaces enabling an impermeable and detachable connection of storage devices so as to make the storage device modular.

6. The device for storing and restoring electrical energy according to claim 1, wherein said chamber comprises electrical energy converters common to said electrolyzer and to said fuel cell.

7. The device for storing and restoring electrical energy according to claim 1, wherein said chamber comprises a cooling device common to said electrolyzer and to said fuel cell.

8. The device for storing and restoring electrical energy according to claim 1, wherein said chamber comprises a water reservoir supplying said electrolyzer and enabling the water produced from said fuel cell to be stored.

9. The device for storing and restoring electrical energy according to claim 1, wherein said chamber is supplied with a source of renewable energy and/or with a source of fossil energy and/or with a source of nuclear energy.

10. The device for storing and restoring electrical energy according claim 1, wherein the device comprises a heat recovery device configured to cool the chamber.

11. The device for storing and restoring electrical energy according to claim 1, wherein said communication interfaces of said chamber comprise at least one input interface connected to said water electrolyzer, one output interface connected to said fuel cell and one storage interface connected to said water electrolyzer and said fuel cell, said storage interface configured to communicate between said chamber and said storage devices.

12. The device for storing and restoring electrical energy according to claim 11, wherein said input and output interfaces comprise at least one detachable electrical energy connection and one detachable water pipework connection, and wherein said storage interface comprises at least one detachable electric control connection and one detachable gas pipework connection.

* * * * *